United States Patent [19]
Udelle et al.

[11] Patent Number: 5,673,651
[45] Date of Patent: Oct. 7, 1997

[54] ANIMAL TOY HAVING PIVOTALLY MOUNTED ANNULAR BALL CONFINING TRACK

[76] Inventors: Steven D. Udelle; Laura L. Udelle, both of 13 Seasons Dr., Punta Gorda, Fla. 33983

[21] Appl. No.: 618,899

[22] Filed: Mar. 20, 1996

Related U.S. Application Data

[63] Continuation-in-part of Ser. No. 475,936, Jun. 7, 1995, Pat. No. 5,517,948.

[51] Int. Cl.$^6$ ............................................. A01K 29/00
[52] U.S. Cl. .................... 119/706; 119/707; 446/168
[58] Field of Search .................... 119/702, 706, 119/707, 711; 446/131, 136, 168, 170

[56] References Cited

U.S. PATENT DOCUMENTS 3,080,167  3/1963  Hansard ............................ 446/170
3,202,426  8/1965  Carper ............................. 446/170
4,722,299  2/1988  Mohr .............................. 119/707

*Primary Examiner*—Todd E. Manahan

[57] ABSTRACT

A toy for cats provided with a freely moving pivotal annular ball and track mounted on springs surrounding a circular housing. An upper surface (54) provides containment of continuous track assembly (29) around housing (32). A plurality of flexible springs (34) support the track assembly (29) in a level position. As a cat claw scratches on the upper surface material (56), any downward pressure of the track top (40) or outer bottom track edge (44) by the animal's weight will cause the track assembly (29) to pivot or tilt, thereby causing a ball (50) to roll in the track interior. The movement of the ball provokes an animal into immediate play. A miniature electronic sound synthesizer (58) is employed within the housing (32) and intermittantly broadcasts mouse related scratching sounds and such, thereby serving as an attractant to the animal, and encouraging the claw scratching needs inherent to cats.

11 Claims, 2 Drawing Sheets

ANIMAL TOY HAVING PIVOTALLY MOUNTED ANNULAR BALL CONFINING TRACK

This is a continuation-in-part of application Ser. No. 08/475,936 filed Jun. 7, 1995, now U.S. Pat. No. 5,517,948.

FIELD OF THE INVENTION

The present invention deals with animal toy and claw scratching devices, but more particularly to an improved combined animal device that provides claw scratching and indirect motion of an object within the device as a compelling attraction to an animal, whereby an animal will frequent the device on its own initiative more often, thereby improving its physical condition, health, and mental alertness through its own efforts.

BACKGROUND—DISCUSSION OF THE PRIOR ART

U.S. Pat. No. 5,269,261 by McCance, Dec. 14, 1993 shows a track and ball with a corrugated cardboard claw scratching means. Applicants have purchased this device and other ball track devices. The pet owner has to participate in moving the ball before a cat will join in. When the cat is claw scratching, the ball remains motionless and therefore does not present the incentive of motion. These purchased devices are seldom used, unless a human forces the ball into play. The prior art does not teach on the use of a motivational means that would exhibit an irresistible incentive or attraction to an animal, whereby the animal would benefit from increased use of the device more often.

SUMMARY OF THE INVENTION

The present invention takes advantage of the inherent instincts of an animal's response to a moving object, when the original movement of the object is not directly initiated by the animal or human hand, but by the device. Generally, the present invention comprises a circular housing forming a base, with an annular ring forming a track loosely encircling the housing and supported level by a plurality of springs affixed to the lower edge of the housing. A freely movable object, such as a ball is confined within the track and viewable from a continuous opening in the side of the track. An upper surface is affixed to the upper edge of the housing and limits the vertical rise of the track. The upper surface contains a claw scratching material. Any slight downward pressure on the upper track ring assembly will cause the track ring to move or tip downwards opposing the springs, as an animal mounts the carpeted platform, thereby causing a ball within the track to move. Whenever an animal mounts the device for claw scratching, the lure or ball will move due to the slight tipping of the track upon contact. The movement of the ball will always produce a reaction from the animal, whereby chasing or swatting the ball is imminent.

It is therefore an object of the present invention to provide an animal toy and claw scratching device that does not require any direct contact with a lure ball by an animal or human hand to initiate a provocative movement of the lure ball.

It is an object of the present invention to have an animal expend its surplus energy, thereby developing improved muscle tone, alertness, coordination, and better sleeping habits.

It is an object of the invention that upon mounting the device, a cat will always respond to the moving lure.

It is another object that the animal toy and claw scratching device would relieve the animal from boredom by providing more frequenting, thereby saving areas of household furniture from damage.

It is yet another object of the invention that the employment of an electronic sound synthesizer in the device serves as an attractant to a cat.

Other objects and advantages may be readily determined by the following descriptions.

COMPLETE DESCRIPTION OF THE INVENTION

Figure 1:
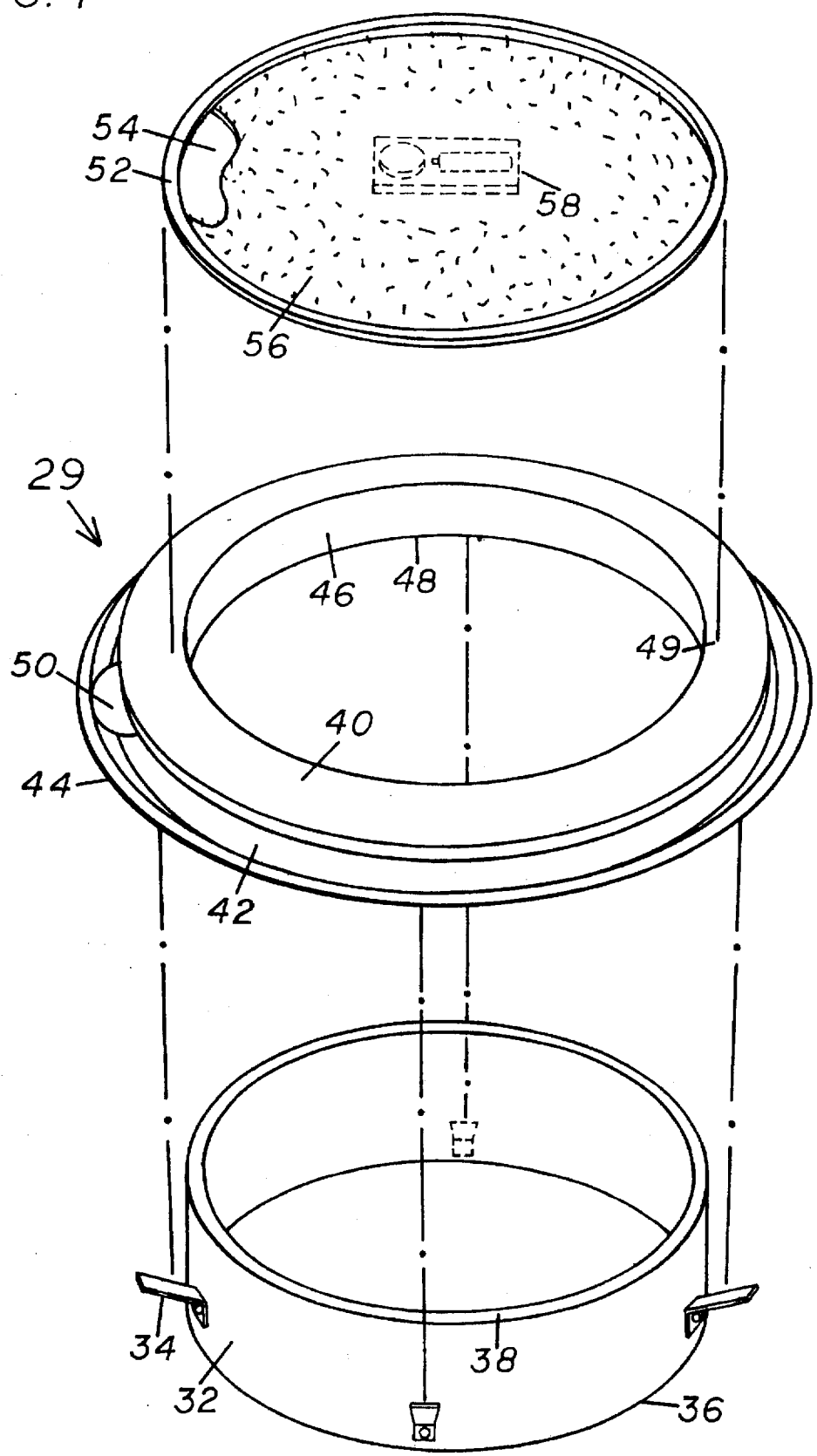
FIG. 1 is an assembly shown in an exploded perspective view of a freely movable circular track ring, and a carpeted housing.

FIG. 1 is an exploded perspective view of a preferred embodiment of the present invention showing a circular housing 32 forming a base having a lower edge 36 and an upper edge 38. A plurality of yielding spring blades 34 are affixed near the lower edge 36 of housing 32. An annular ring assembly forming a continuous track 29 encircles the peripheral sidewall of housing 32 and freely rests with a level attitude on spring blades 34. The continuous track assembly 29 is comprised of an inner wall 46, a bottom 48, a top 40, and an open side 42. The bottom 48 of the track angles outwards 44, thereby confining a ball 50 disposed therein and freely movable. The track assembly 29 inner wall 46 is provided with sufficient spacing around the peripheral housing 32 wall surface, to permit the track assembly 29 to be freely pivotal angularly, and laterally around housing 32 surface as its bottom 48 rests on the yielding spring blades 34. The underside of upper planar surface 54 is heat sealed to upper edge 38 of housing 32, thereby limiting the vertical rise of track assembly 29 around housing 32. Upper surface 54 is slightly larger in diameter than the housing 32 diameter, thereby overlapping onto the top 40 of track assembly 29 at top portion 49. The spring blades 34 have sufficient tension to hold track assembly 29 top surface 40 flush against the overhanging underside of upper surface 54. The upper surface 54 employs a raised ridge 52 around its edge to serve as a finishing means for claw scratching material 56. A miniature sound synthesizer 58 is affixed to the underside of upper surface 54.

Figure 2:
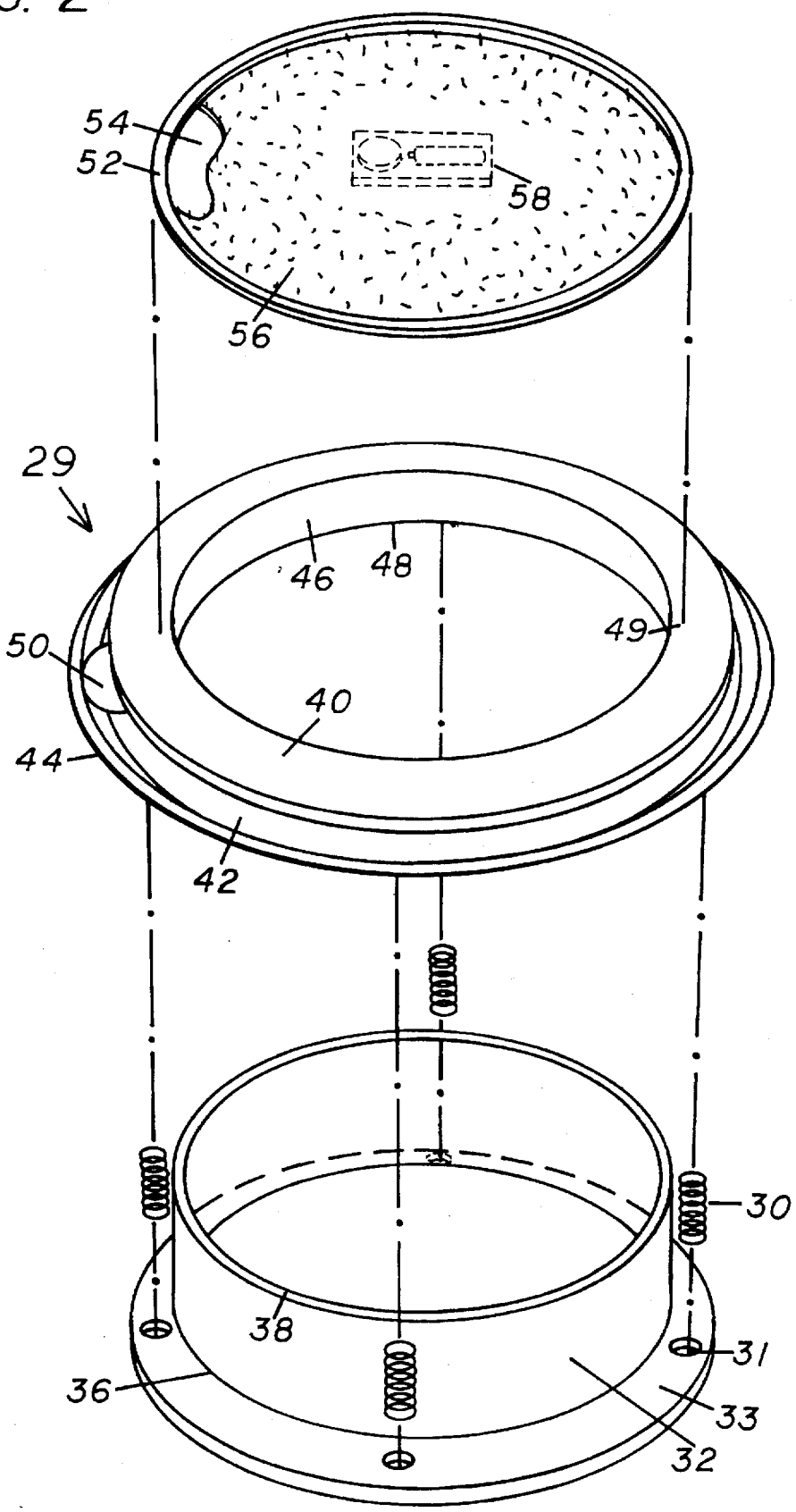
FIG. 2 is an exploded perspective view of an alternate embodiment of FIG. 1.

FIG. 2 is an exploded perspective view of an alternate embodiment of FIG. 1. The addition of flange 33 affixed to the lower edge 36 of housing 32 provides a means for substituting the spring blades 34 as shown in FIG. 1 for a plurality of helical springs 30. The lower portion of helical springs 30 are permanently affixed to their respective openings 31. The track ring assembly 29 is held level by the springs and is freely pivotal angularly and laterally around housing 32 outside wall surface. The rest of FIG. 2 is identical to FIG. 1. Unlike applicants' earlier device, the track ring assembly 29 of FIGS. 1 and 2 can be deflected downwards at any point of vits 360 degree circumference, thereby always initiating a positive ball movement from any point of contact with the track top 40 and angled bottom 44. The improved present invention produced new and unexpected results in the performance of an animal's playing techniques and exercise. The improved sensitivity of the pivotal track initiates better ball response. The animal will chase the orbiting ball around the outside perimeter of the device promoting better exercise. The ball is only visible to an animal in a portion of the track, thereby requiring the animal to use its thought processes in finding the ball for further play. The animal will also lay in a fixed position by the track side opening and repeatedly propel the ball with one paw as the ball orbits the track for extended periods of time. Tracks that have a ball viewable from a top opening limit the technique of play and exercise of an animal, as one or more of their paws stand inside the track opening and block the ball from orbiting. Applicants have rarely seen an animal chase an orbiting ball around the outside perimeter of an open top track, as the ball is always visible to pounce upon instead. A miniature electronic sound synthesizer 58 is affixed to the underside of upper surface 54. The electronic sound synthesizer may be of the greeting card type or children's toy synthesizer that is programmed to broadcast intermittant mouse related scratching sounds and/or squeaks to attract the animal to the device. The synthesizer may also employ an on-off switch. A sound such as a mouse scratching would promote more frequent claw scratching inherent in cats on the device thereby preventing household furnitures from being damaged.

Conclusion

Thus, it has been shown that the action of the present invention solves the shortcomings of passive devices, past and present, thereby satisfying the consumers investment with a realistic and more frequently used product. While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. Animal toy having a pivotally mounted annular ball confining track comprising:

a) a circular housing forming a base having a lower edge and an upper edge;

b) an annular ring forming a continuous track encircling said housing, said continuous track having an inner wall, a bottom, a top, and an open side;

c) an object disposed within said continuous track and freely movable therein;

d) an upper surface affixed to said upper edge of said housing; and e) biasing means disposed about said housing near said lower edge for biasing said continuous track to a first position wherein said top of said continuous track lies substantially parallel to said upper surface, whereby when said continuous track is pivoted from said first position against said biasing means, said movable object is caused to rotate in said continuous track about said housing.

2. The device of claim 1, wherein said biasing means comprises a plurality of blade-type springs disposed around said housing and affixed near said lower edge thereof, each of said springs being in contact with said bottom of said continuous track when said continuous track is in said first position.

3. The device of claim 1, wherein said movable object comprises a plastic ball.

4. The device of claim 1, wherein said upper surface is provided with a suitable surface for permitting an animal to scrape its claws thereon and thus function as a scratching pad for said animal.

5. The device of claim 1, further comprising said lower edge of said housing having a flange affixed thereto orthogonal to said housing.

6. The device of claim 5, wherein said biasing means comprises a plurality of helical springs affixed to said flange.

7. The device of claim 6, wherein said plurality of helical springs are disposed upon said flange around said housing near said lower edge thereof, each of said helical springs being in contact with said bottom of said continuous track when said continuous track is in said first position.

8. The device of claim 1, further comprising an electronic sound synthesizer affixed to an underside of said upper surface.

9. The device of claim 8, wherein said sound synthesizer broadcasts mouse related scratching sounds therefrom.

10. The device of claim 9, wherein said sound synthesizer broadcasts mouse related squeaks therefrom.

11. The device of claim 8, wherein said sound synthesizer broadcasts sounds that are attractants to cats.

* * * * *